April 27, 1965  C. W. MacMILLAN  3,180,033
AUTOMOTIVE WHEEL ALINING APPARATUS
Filed May 8, 1962  5 Sheets-Sheet 1
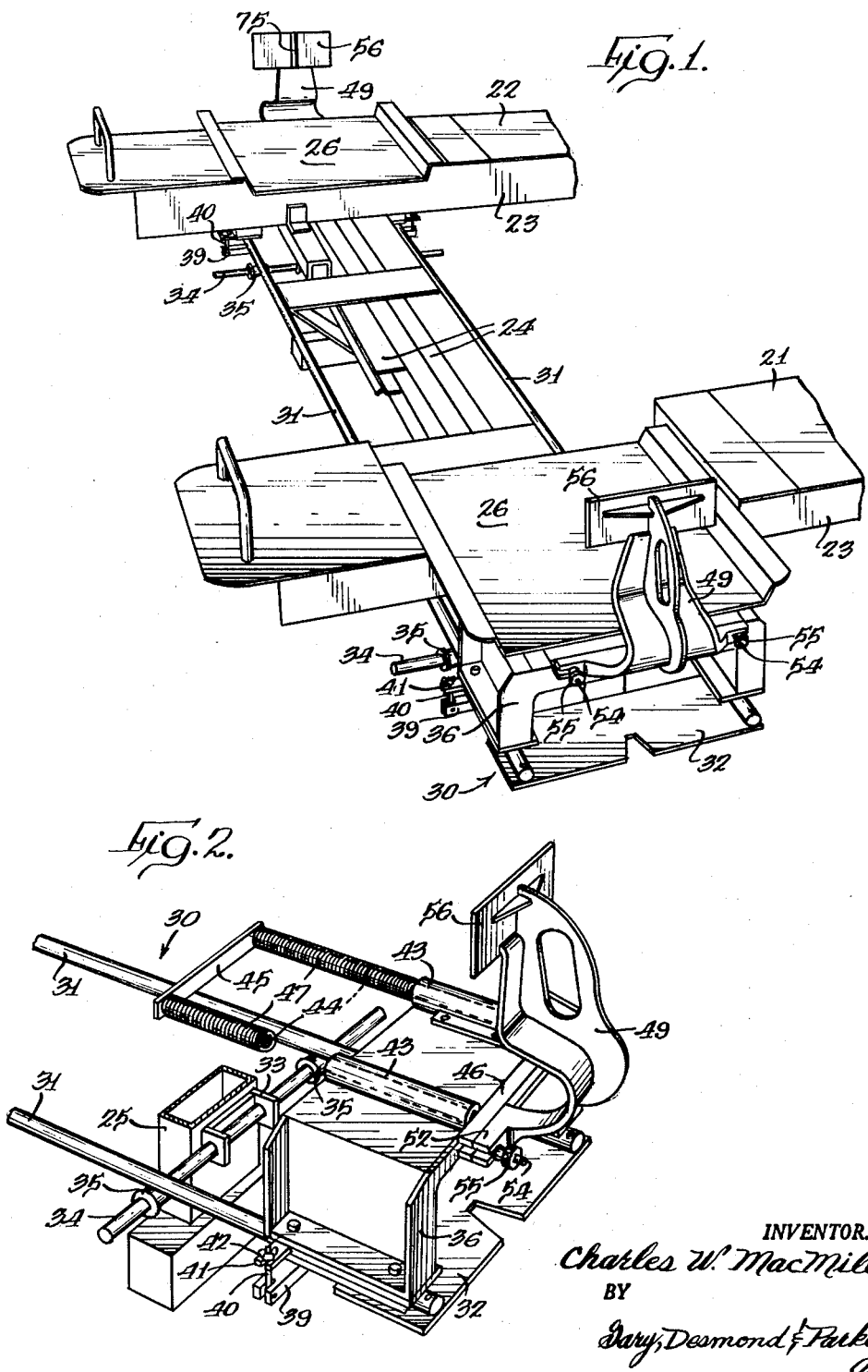
INVENTOR:
Charles W. MacMillan
BY
Dary, Desmond & Parker
Attys

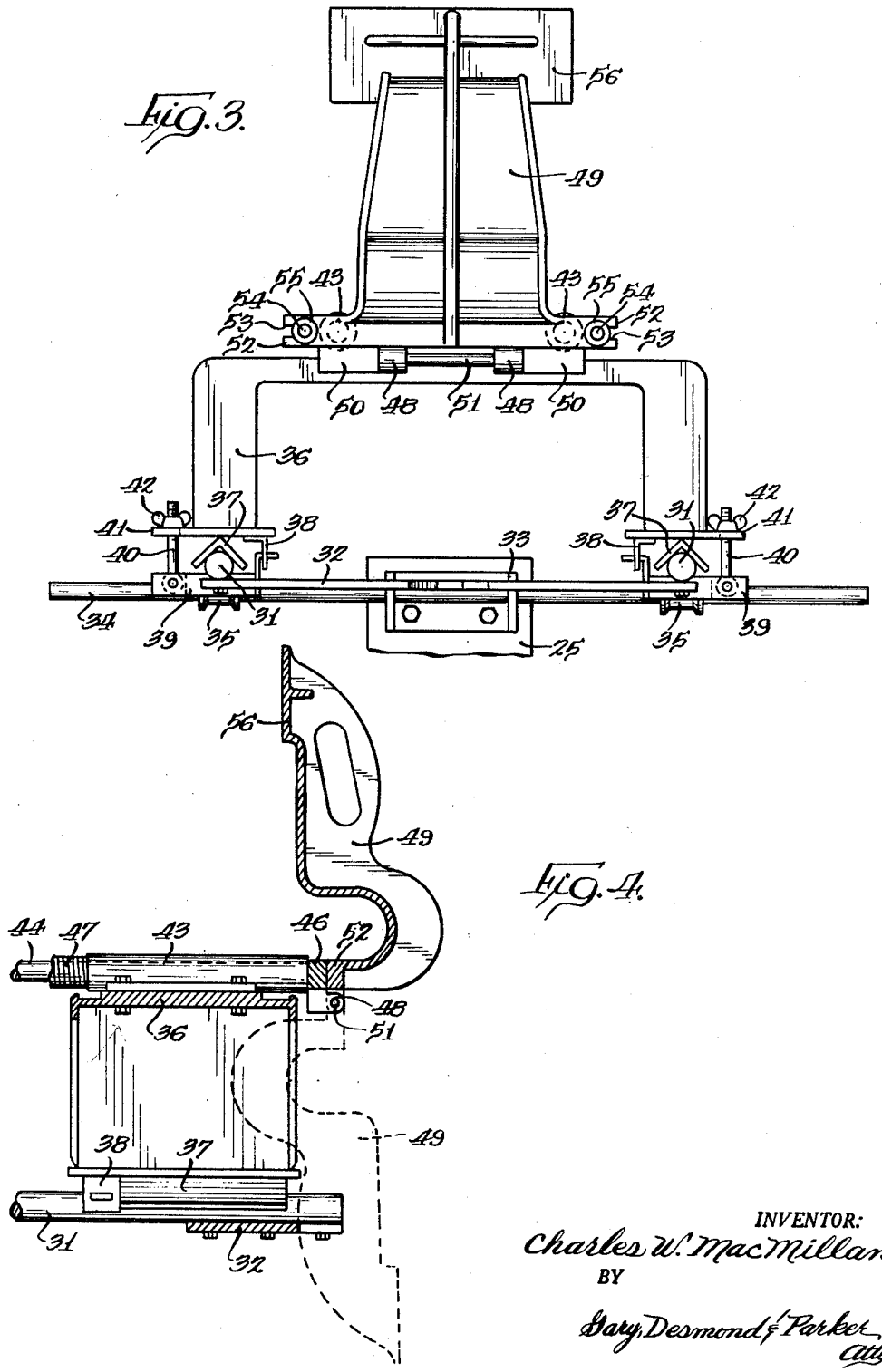

April 27, 1965

C. W. MacMILLAN 3,180,033

AUTOMOTIVE WHEEL ALINING APPARATUS

Filed May 8, 1962

INVENTOR:
Charles W. MacMillan
BY
Mary, Desmond & Parker
Att'ys

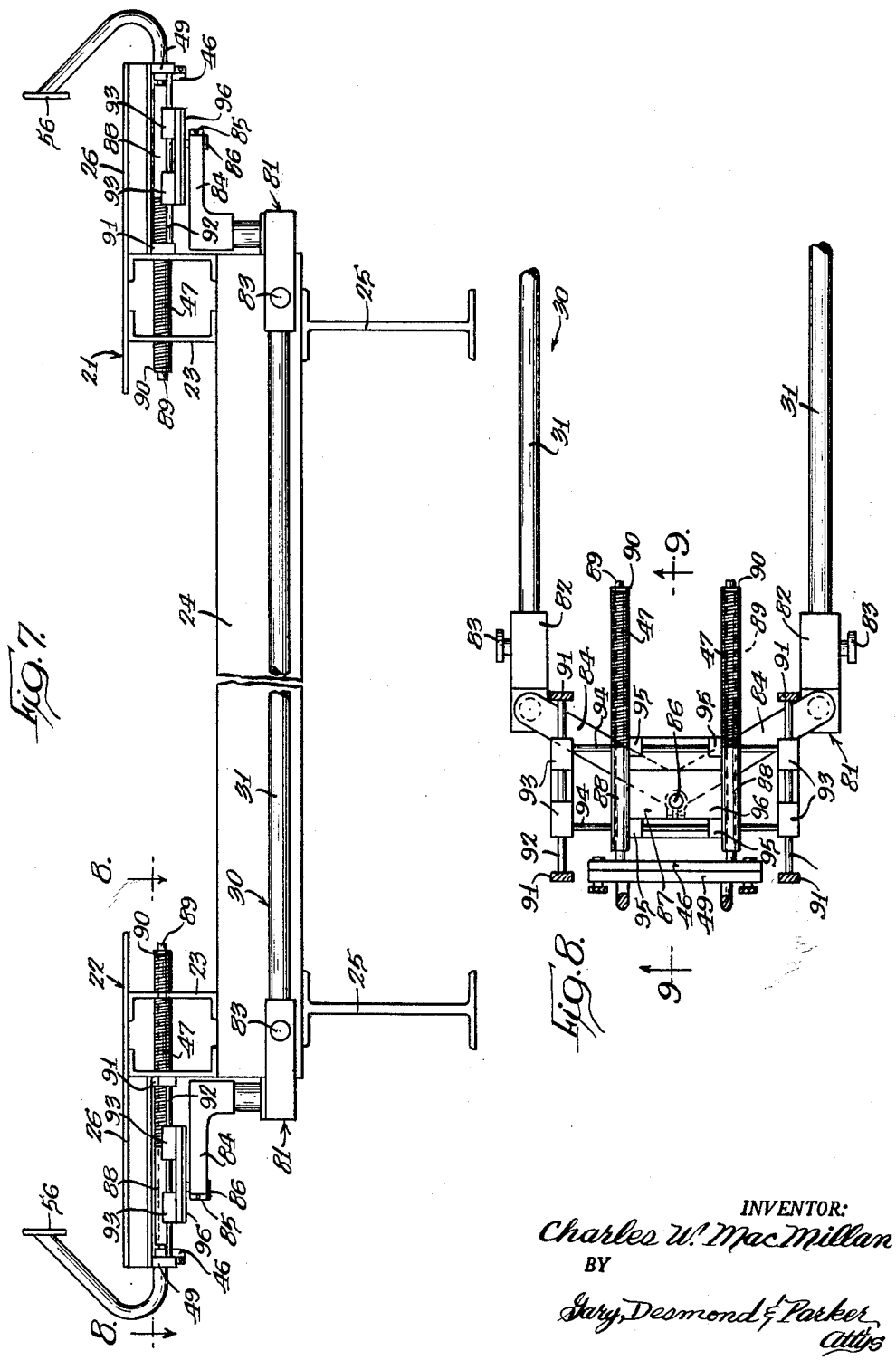

April 27, 1965
C. W. MacMILLAN
3,180,033
AUTOMOTIVE WHEEL ALINING APPARATUS
Filed May 8, 1962
5 Sheets-Sheet 5
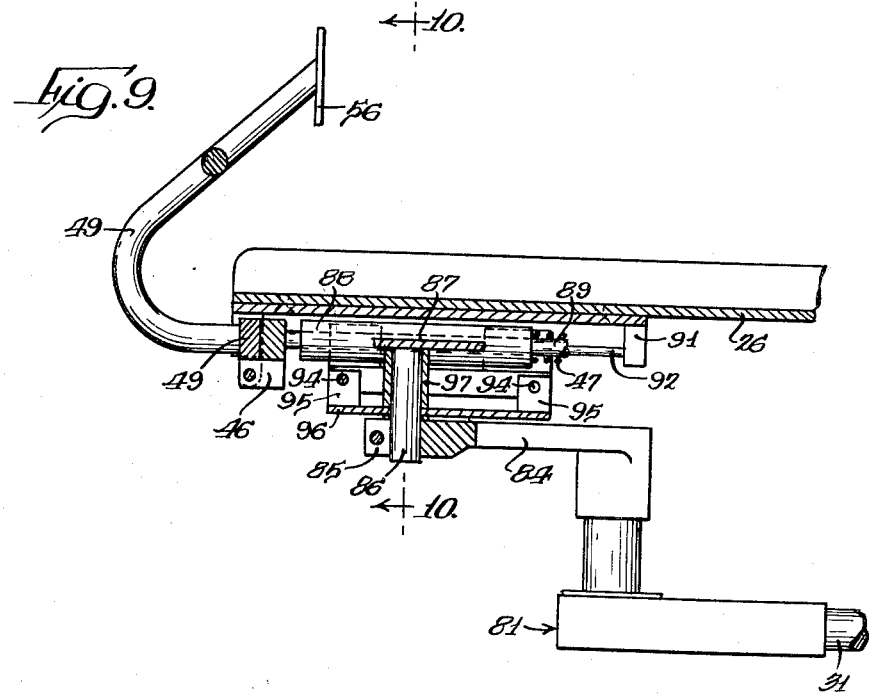
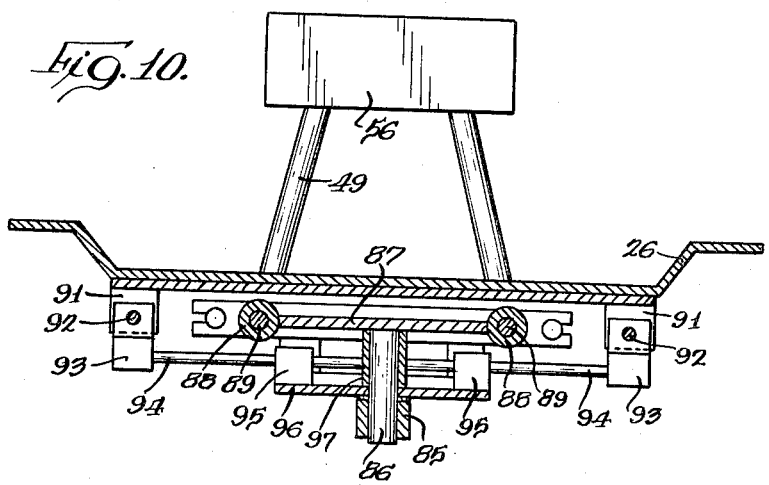
INVENTOR:
Charles W. MacMillan
BY
Bary, Desmond & Parker
Att'ys

United States Patent Office 3,180,033
Patented Apr. 27, 1965

3,180,033
AUTOMOTIVE WHEEL ALINING APPARATUS
Charles W. MacMillan, Rock Island, Ill., assignor to Bear Manufacturing Company, Rock Island, Ill., a corporation of Delaware
Filed May 8, 1962, Ser. No. 193,218
11 Claims. (Cl. 33—203.12)

The present invention relates to improvements in wheel alining apparatus, and particularly, to improvements in the wheel alinement testing machine disclosed in Patents 2,765,540, 2,775,042 and 2,923,067, assigned to the assignee of this application.

Said patents disclose a wheel alinement testing machine adapted to measure or determine all five angles critical to the steering wheel geometry of automotive vehicles, namely, camber, caster, kingpin or steering axis inclination, toe and turning radius. The machine in its preferred embodiment comprises a vehicle rack including runways for the vehicle wheels, combined turning plates and turning radius gauges mounted in said runways for reception of the front or steering wheels of vehicles, and a pair of gauges to be attached respectively to the wheels on the turning plates and adapted to determine camber, caster and kingpin or steering axis inclination, toe measuring or determining means in the gauge housings, and abutment plates on each runway defining fixed references for the toe determining means.

The patented machine further is characterized by means for indicating at a remote location the measured angles, said means comprising an electric circuit including variable resistance means controlled by the gauges and a galvanometer movable in response to variations in circuit resistance, a mirror moved by the galvanometer, a light beam projected on and variably reflected by the mirror, and a scaled screen on which the beam is reflected to afford a remote indication of measured angles.

The described machine has proven itself highly advantageous and has met with substantially commercial success. However, the same has suffered one disadvantage, namely, that the vehicle must be located with a high degree of accuracy on the runways in order to dispose both steering wheels in such position that the two gauges may cooperate properly with the fixed references for the toe determining means of the machine.

The measurement of the toe of an automobile is an extremely minute measurement. For example, one half degree inclination of the plane of the wheel, when the wheels are substantially parallel, represents one quarter inch toe on the standard wheel, and standard specifications are set in terms of one thirty-second inch of toe which represents about one minute of angular measurement. Consequently, with the reference or datum surfaces fixed to the runways, the vehicle wheels must be accurately located on the runways relative to said surfaces, which is difficult of accomplishment.

The principal object of the present invention is the provision of a reference fixture for the toe determining means of said machine overcoming the stated disadvantage, and providing advantages not previously attained with said machine.

It is particularly an object of the invention to provide an improved toe fixture that is freely movable in a horizontal plane parallel to the runways and that embodies reference surfaces disposed in predetermined relationship to one another for cooperation with the toe determining means of the machine, the fixture as a whole being movable from side-to-side, backward and forward and being swingable in a horizontal plane thereby to aline the reference surfaces with the toe determining means irrespective of the positions of the wheels and the vehicle, and also to accommodate free turning of the vehicle wheels when the reference surfaces are engaged with the toe determining means.

Another object of the invention is to provide an improved toe fixture as aforesaid including means for interlocking the reference surfaces and the reference engaging elements of the toe determining means whereby the wheels and the fixture may be swung horizontally as a unit without changing the relationship between the fixture and said reference engaging elements, thereby to facilitate accurate and reliable splitting of the combined toe of the two wheels to opposite sides of the longitudinal axis of the vehicle irrespective of the position of the vehicle on the runways.

An additional object of the invention is to provide economical physical embodiments of my improved fixture; especially one comprised of a rod extending longitudinally beneath each wheel runway; a pair of spool bearings slidably and rotatably mounted on each rod; rigid beam means comprising two spaced parallel rods movably supported on said bearings and extending transversely beneath the runways where they will not interfere with the runways and other elements of the machine, or with vehicles driven onto and off of the runways; and reference surface means adjustably mounted adjacent the outer ends of the beam means.

A further object of the invention is the provision of improved toe determining means including a pair of adapters to be engaged with and abutted against the ends of the hubs of the two steering wheels, a pair of gauge means pendulously supported on the adapters on axes parallel to the spindles of the respective wheels and in planes parallel to the hub ends of the respective wheels, horizontally swingable toe determining elements extending outwardly from the gauges and terminating in planar surfaces parallel to the respective wheel hub ends, and a fixture as above described including planar reference surfaces alined with one another longitudinally of the beam means and facing toward one another in spaced parallel relation for engagement flush against the planar surfaces of said elements, thereby to cause said elements to assume angular positions relative to said gauge means exactly equal or complemental to the toe of the wheels.

A still further object of the invention is the provision of an improved adapter for the above stated purpose, and for the mounting of wheel gauges in general.

Other objects and advantages of the invention will become apparent from the following detailed description.

Now, in order to acquaint those skilled in the art with the manner of making and using my improved toe fixture, I shall describe, in connection with the accompanying drawings, preferred embodiments of the fixture and the preferred manners of making and using the same.

In the drawings, wherein like reference numerals indicate like parts:

FIGURE 1 is a fragmentary perspective view of the front end portion of a wheel alinement rack equipped with the preferred embodiment of the toe fixture of the present invention;

FIGURE 2 is a fragmentary perspective view of one end portion of said toe fixture;

FIGURE 3 is an end elevation of the fixture;

FIGURE 4 is a vertical section of one end portion of the fixture;

FIGURE 7 is a front elevation of a second embodiment of the toe fixture of the present invention;

FIGURE 8 is a plan view of one end portion of the fixture of FIGURE 7, the view being taken substantially on line 8—8 of FIGURE 7;

FIGURE 9 is a vertical section taken substantially on line 9—9 of FIGURE 8; and

FIGURE 10 is a vertical section taken substantially on line 10—10 of FIGURE 9.

Figure 5:
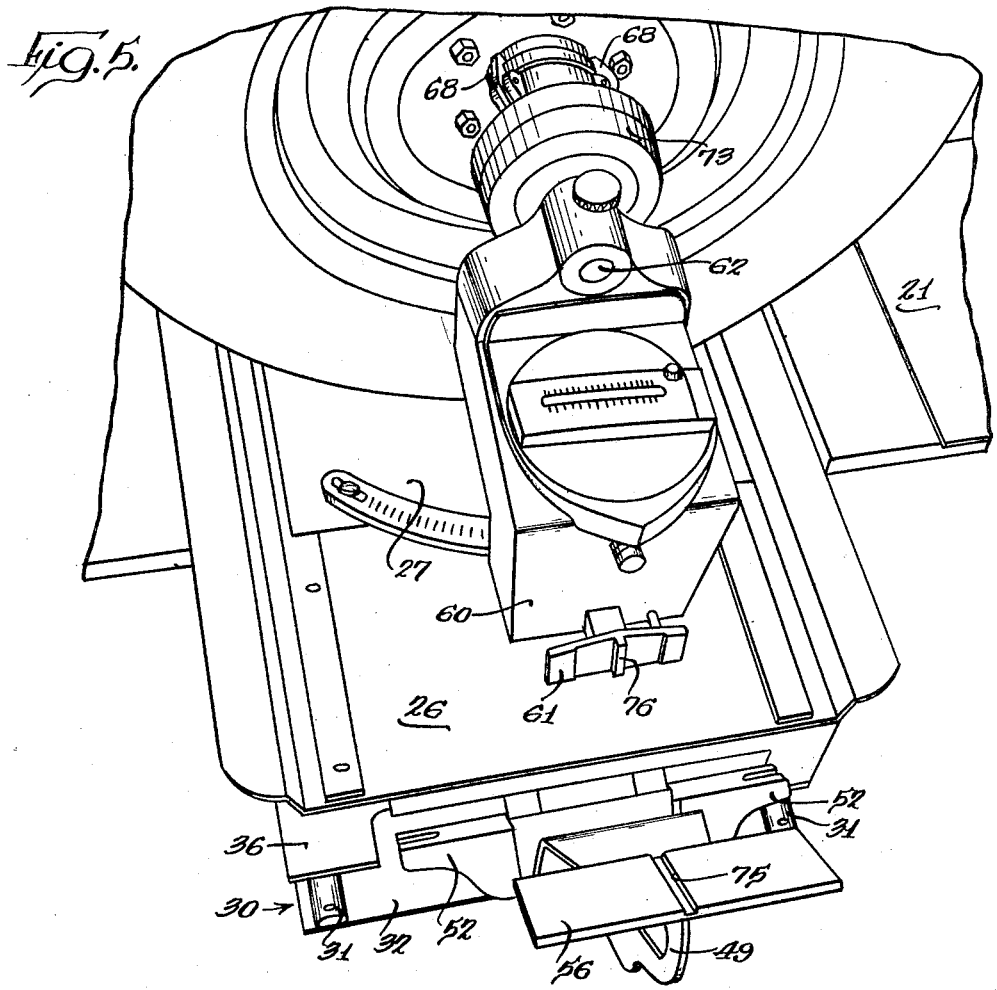
FIGURE 5 is a fragmentary perspective view showing the wheel alining apparatus of the invention applied to one vehicle wheel.

Referring in detail to the drawings, 21 and 22 indicate runways for the support of the wheels of an automobile, the runway 21 being adapted to support the left wheels of an atuomobile and the runway 22 being adapted to support the right wheels of the automobile, the left and right designations being referred to the position of the wheels as viewed by the driver of the vehicle. The runways 21 and 22 are supported by channel irons 23 disposed so as to form substantially a beam of box section. The channels 23 in turn are supported at their front ends by a press beam 24 comprised of spaced I-beams which extend transversely beneath the channels 23 and are supported by I-beam legs 25 located beneath the runways. As many transverse groups of I-beams 24 may be employed as desired throughout the length of the runway, but only one such group is shown.

Immediately above the press beam 24 each runway includes an indented and outwardly extending tray portion 26 adapted for detachable reception of a turning radius gauge 27 (FIGURE 5). Each turning radius gauge 27 is of conventional construction, comprising a plate rotatably mounted upon ball or roller bearings whereby the plate may be conveniently rotated while carrying the front wheel of an automobile thereby to facilitate turning or swinging of the wheel. The turning radius gauges per se form no part of the present invention and are employed merely as a convenient expedient to permit the swinging of the front wheels of an automobile. For purposes of explanation of the invention, the left front wheel of an automobile is shown as being mounted upon the turning radius gauge 27 in FIGURE 5.

In order to accommodate the runways 21 and 22 and turning radius gauges 27 to automobiles of different track widths, the channels 23 of the right runway 22 are releasably clamped to the supporting press beam 24 in a manner known in the art, whereby the right runway may be moved toward and away from the left runway to match the track width of the vehicle to be tested.

In accordance with the present invention, the illustrated and described runway structure is provided with a toe fixture comprising a transverse beam 30 fabricated of two rods 31 which are disposed to opposite sides of the press beam 24 and are retained in spaced parallel coextensive relation to one another by end plates 32 secured to the opposite ends of the rods. The thus constituted beam extends transversely beneath and outwardly beyond the runways 21 and 22 beneath the trays 26 and is supported for free movement in a horizontal plane parallel to the runways.

In the embodiment of the invention shown in FIGURES 1 to 4, the transverse beam 30 is supported with freedom for backward, forward, side-to-side and horizontal swinging or swiveling movement by bearing means mounted on the two legs 25 of the runway structure. Each said bearing means comprises a bracket 33 secured to the outer face of the respective leg, a rod 34 extending longitudinally of the respective runway in spaced parallel relation thereto and mounted centrally of its length on the bracket, and a pair of spool bearings rotatably and slidably mounted on the rod to opposite sides of the bracket; the beam rods 31 being rested on the bearings and thereby being supported for side-to-side movement by virtue of rotation of the bearings on the rods, for backward and forward movement by virtue of sliding of the bearings on the rods, and for horizontal swiveling movement by combinations of the two bearing movements and pivotal movement of the rods 31 on the bearings.

Adjustably supported on each end of the beam 30 is a datum mount 36 comprising an inverted U-shaped block of generally the same width as the beam, the block carrying relatively elongate inverted V-guides 37 on the lower ends of its legs which engage over and aline the mount with the beam rods 31. Adjacent the inner end of the mount 36, each leg thereof is provided with a depending slotted angle 38 comprising a hinge mount for a hook 39 which is adapted to be slipped into the slot in the angle and under the respective rod 31 to clamp the mount to the beam; clamping being effected by a bolt 40 pivotally connected to the hook and adapted to be swung into and out of the slotted end of a plate 41 rigidly united to the mount, and a wing nut 42 threaded onto the bolt for clamping engagement with the plate 41. Upon loosening of the nuts 42, each mount 36 may be shifted inwardly and outwarldy on the beam 30 to locate the mounts beneath the turning plate trays 26, as shown in FIGURE 1.

A pair of sleeves 43 are mounted on the upper surface of each of the datum mounts 36 in spaced parallel relation to one another and the beam rods 31. A rod 44 extends slidably through each sleeve, and the pair of rods on each mount are interconnected at their inner ends by a cross tie 45 and at their outer ends by a hinge block 46. Compression springs 47 encircle each rod between the respective sleeve 43 and the tie 45, whereby the rods are normally biased inwardly to the extent accommodated by abutment of the hinge block 46 against the outer ends of the sleeves.

The hinge block 46 on each mount carries a pair of spaced hinge sleeves 48. An abutment bracket 49 carries two spaced hinge sleeves 50 at its lower end disposed to opposite sides of the hinge sleeves 48, and which with the latter and a pintle pin 51 form a hinge about which the abutment bracket may be swung. The abutment bracket 49 at its lower side carries oppositely extending anchor portions 52 which are slotted, as at 53, to receive the ends of toggle studs 54 which are pivotally mounted in slots in the hinge block 46. The toggle studs extend through the oppositely extending anchor portions 52 of the abutment bracket 49 whereby, by means of thumb nuts 55, the abutment bracket may be mounted in operative position, as shown in FIGURES 1 to 4. When it is desired not to use the abutment bracket, the nuts 55 may be loosened and the toggle studs 54 pivoted out of contact with the abutment bracket whereby the bracket may be swung to the out-of-the-way position indicated in dotted lines in FIGURE 4. The abutment bracket in its operative position is spring biased by springs 47 and may be moved laterally outwardly against the compression of said springs. At the upper portion of the abutment bracket 49, an abutment or datum plate 56 is formed.

In view of the precise character of the measurements to be taken, all of the components of the transverse beam 30, the mounts 36, the hinge blocks 46 and the abutment brackets 49 are made and assembled to exacting tolerances and are interconnected without freedom for lost motion whereby the two mounts 36 straddle the beam rods 31 in perpendicular relation thereto and spaced parallel relation to one another, the rods 44 mount the hinge blocks 46 for movement longitudinally of the beam 30 and perpendicular to the mounts 36, and the blocks 46 mount the abutment brackets 49 in spaced parallel relation in alinement with one another longitudinally of the beam 30. In keeping with these principles, the bearings 35 and rods 34 mount the beam 30 for movement in a horizontal plane parallel to the wheel supporting surfaces of the runways 21 and 22.

When swung into operative position, as shown in solid lines in FIGURES 1 to 4, the datum plates 56 of the abutment brackets 49 comprise reference or datum surfaces which in the embodiments of the invention herein shown comprise vertically extending planar surfaces facing toward and alined with one another and disposed in exactly spaced parallel relation to one another perpendicular to the beam means 30.

The reference surfaces defined by the datum plates 56 are adapted for cooperation with gauge means mounted on the two steering wheels of the vehicle and comprising part of the testing machine disclosed in detail in said Patents 2,765,540 and 2,923,067. Each such gauge, one of which is indicated at 60 in FIGURE 5, is supported on the respective wheel on an axis parallel to the wheel spindle and includes means for determining various wheel angles. To the extent here pertinent, each such gauge includes means for determining the wheel toe, which said means includes an outwardly extending horizontally swingable element 61 having a generally planar outer reference face perpendicular to the wheel spindle and adapted for abutment flush against the adjacent datum plate 56.

Figure 6:
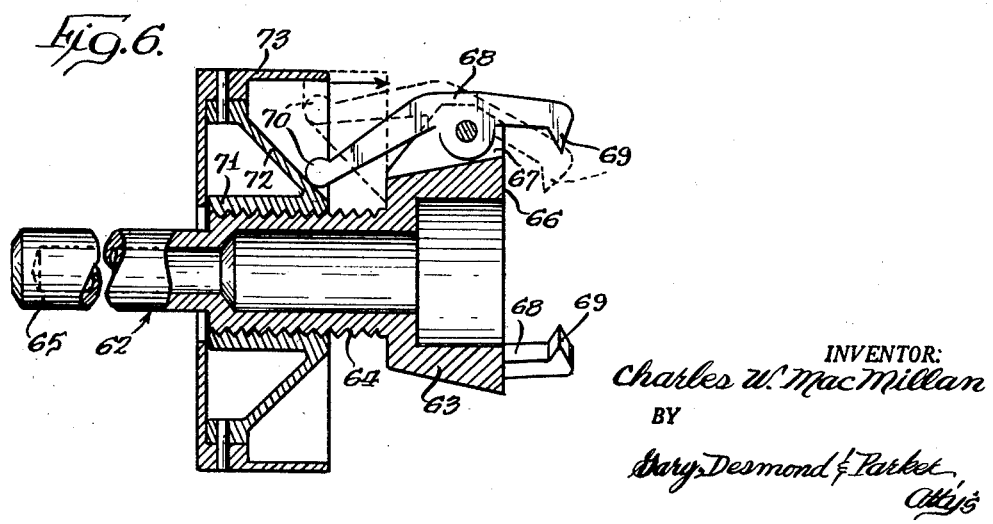
FIGURE 6 is a longitudinal section of the gauge mounting adapter employed in the arrangement of FIGURE 5.

In measuring toe, it is essential that the gauge 60 be suspended from the respective vehicle wheel exactly parallel to the plane of the wheel. To this end, the present invention provides an improved adapter for mounting the gauge on the wheel. As shown in FIGURES 5 and 6, the adapter comprises a shaft 62 having an enlarged tubular inner end portion 63, an intermediate externally threaded portion 64 and a reduced cylindrical outer end portion 65. The inner end portion 63 of the shaft 62 is of a size to be slipped over the spindle and spindle nut of the wheel and has an end face 66 that is exactly perpendicular to the axis of the shaft and that is adapted to be abutted against the machined end surface of the wheel hub whereby the shaft will be disposed exactly perpendicular to the plane of the wheel in alinement (or substantially so) with the wheel spindle. At equal circumferential spacings of 120 degrees, the end portion 63 of the shaft is provided with outwardly radiating bosses 67, each of which defines a pivotal mounting for an attachment lever 68. Each of the three levers 68 comprises a forwardly extending tooth portion 69 adapted to be swung into and out of engagement with the peripheral surface of the wheel hub and a rearwardly or outwardly extending actuator portion 70 extending toward and along the intermediate portion 64 of the shaft 62.

Threaded upon the intermediate portion 64 of the shaft is a nut 71 comprised of an interiorly threaded collar, a frustoconical cam 72 integral with the collar and disposed for engagement with the actuator portions 70 of the levers 68, and a cup-shaped cylindrical hand grip 73 secured to the cam 72 concentric with the collar and adapted to be engaged by hand to thread the nut inwardly and outwardly along the threaded portion 64 of the shaft 62. As the nut 71 is threaded inwardly along the shaft 62, the conical cam 72 engages the actuator ends of the levers 68 and moves the same radially outwardly, whereupon the tooth portions 69 of the levers are swung radially inwardly into engagement with the peripheral surface of the wheel hub thereby to secure the adapter to the wheel hub with the shaft 62 extending perpendicular to the plane of the wheel. To detach the adapter from the wheel, the nut 71 is simply threaded outwardly along the shaft 62, whereupon the cam 72 releases the levers 68 and frees the teeth 69 from the hub. The adapter thus affords a particularly convenient and expeditious coupling and when assembled on the wheel provides a shaft portion 65 perpendicular to the plane of the wheel upon which the gauge 60 may be pendulously suspended.

Each of the gauges 60 is thus suspended in pendulous fashion in outwardly spaced parallel relation to the plane of the respective wheel and the toe determining element 61 thereof projects outwardly from the gauge in perpendicular relation to the spindle of the wheel. To associate the toe fixture of the present invention with the gauges, the slide assembly comprised of the rods 44, the hinge block 46 and the abutment bracket 49 is pulled outwardly against the force of the compression springs 47; the abutment 49 is swung upwardly to its operative position and is locked in such position by the toggle bolts 54 and the thumb nuts 55; and the assembly is permitted to move inwardly under the biasing force of the springs 47 until the reference surface of the respective datum plate 56 is abutted flush against the reference surface of the outwardly projecting element 61 of the respective gauge.

To center the toe fixture relative to the gauges, and to assure conjoint turning movement of the same with the wheels and the gauges, the reference surfaces of the datum plates 56 and the toe determining elements 61 are provided with interlocking and alining means in the form preferably of a vertical slot 75 located centrally of the inner face of each datum plate 56 and an outwardly projecting vertical rib 76 located centrally on each element 61. As the datum plates 56 are brought into engagement with the toe determining elements 61, the toe fixture is moved as necessary to insure that the ribs 76 on the elements 61 fit within the slots 75 in the respective plates 56.

With the toe fixture of the present invention thus associated with the two gauges, the reference surfaces defined by the datum plates 56 are disposed in and retain the reference surfaces of the elements 61 in spaced parallel relation whereby any variation of the planes of the two wheels from parallel relation to the longitudinal axis of the vehicle will result in one or both of the gauges being disposed at an angle to its or their toe determining element or elements 61. As will be appreciated from the earlier patents previously identified herein, this angular relationship will result in indication upon a remote screen of the toe of each of the two vehicle wheels. The indication may be of no toe, a specified degree of toe-in, or a specified degree of toe-out.

If the wheels are turned to the right from a straight-ahead position relative to the longitudinal axis of the vehicle, the indicator for the left wheel will show toe-in, and the indicator for the right wheel will show toe-out, unless the toe angles of the wheels are excessively outside of normal tolerances. The operator may then simply turn or swing the wheels while observing the two indicators until both indicators reveal equal degrees of toe, e.g., zero toe in both wheels, the same degree of toe-in in both wheels, or the same degree of toe-out in both wheels. When turning the vehicle wheels, the toe fixture of the present invention swings along with the wheels in a horizontal plane parallel to the runways and the gauges rotate relative to the wheels in the event of wheel rotation, whereby the toe determining elements 61 retain the same relationship to one another and the datum plates 56. Consequently, the indication of identical toe in both wheels with the fixture of the present invention results in revealing to the operator the fact that both wheels are in straight-ahead steering position relative to the longitudinal axis of the vehicle. The operator may then be assured that toe is correctly adjusted for both wheels, or he may proceed with adjustment of toe as necessary to return the wheel assembly to the toe specifications of the manufacturer. In addition, the particular facility afforded according to the present invention for determining the straight-ahead steering position of the wheels greatly facilitates adjustment of the steering wheel in the driver's compartment of the vehicle to its proper centered position relative to the straight-ahead steering position of the vehicle.

Due to the fact that the toe fixture of the present invention is universally movable in a horizontal plane parallel to the wheel supporting surfaces of the runways 21 and 22 and provides spaced parallel datum surfaces 56, the above described advantages of the present invention are achieved substantially irrespective of the positions of the vehicle wheels and of the vehicle on the runways. In other words, even if the vehicle is located at an angle to the runways, the fixture of the present invention assures precise, accurate measurement of the actual toe of the two steering wheels of the vehicle, and facilitates precise, accurate splitting of toe equally to opposite sides of the longitudinal axis of the vehicle and not of the runway structure.

Referring now to FIGURES 7 to 10, I have shown an earlier embodiment of my toe fixture as applied to a runway structure essentially the same as that previously described. The toe fixture is again characterized by a transverse beam 30 comprised of spaced parallel rods 31 which straddle the press beam 24 and are mounted for universal movement in a horizontal plane beneath the runways 21 and 22. In this embodiment of the invention, the two rods 31 are interconnected at their opposite ends and retained in spaced parallel coextensive relation by rigid end assemblies 81 each comprised of a pair of spaced parallel sockets 82 equipped with set screws 83 for detachable reception of the ends of the rods 31, a pair of diagonal legs 84 spaced above and rigidly connected to the sockets which extend diagonally toward one another in the direction outwardly of the respective runway, and a split clamping ring 85 integral with the convergent ends of the legs. The ring 85 is rigidly but detachably secured to a vertical pivot shaft 86 which is fixedly secured at its upper end to a datum mount 87.

Each datum mount 87 is comprised of a horizontal plate and a pair of sleeves 88 which extend in spaced parallel relation to one another and the beam rods 31. A rod 89 extends slidably through each sleeve, and the pair of rods on each mount are interconnected at their outer ends by a hinge block 46 substantially identical to that previously described. Compression springs 47 encircle each of the rods 89 between the respective sleeve 88 and a head 90 provided on the inner end of each rod, whereby the two rods are normally biased inwardly as a unit to the extent accommodated by abutment of the hinge block 46 against the outer ends of the sleeves 88.

The hinge block 46 on each datum mount 87 pivotally mounts an abutment bracket 49 of the same character, though somewhat different construction, than the abutment bracket 49 previously described. The pivotal mounting of the abutment bracket accommodates vertical swinging movement of the same between an operative upright position as shown in FIGURES 7 to 10, and a depending out-of-the-way position as depicted in dotted lines in FIGURE 4. At its upper end, the bracket 49 carries an abutment or datum plate 56 of the same character and performing the same functions as the datum plate previously described.

The beam rods 31, end assemblies 81, pivot shafts 86, datum mounts 87 and abutment brackets 49 thus constitute a rigid beam structure traversing the two runways beneath the same and provided at its opposite ends with reference surfaces 56 which extend upwardly above the runways to the outer sides of the same for cooperation with the gauges 60 mounted on the wheels of the vehicle to be tested; the abutment surfaces being swingable between operative and out-of-the-way positions, and being spring-biased inwardly relative to the runways for cooperation with the gauges.

To mount the thus constituted beam structure with freedom for backward, forward, side-to-side and horizontal swiveling movement relative to the runways, a bearing assembly or means is provided beneath each runway tray 26. Each bearing assembly comprises four brackets 91 secured to the lower side of the tray 26 and supporting a pair of spaced parallel rods 92 beneath the respective tray, the rods being disposed in spaced parallel relation to the runways but extending at right angles thereto. Each rod 92 slidably supports a pair of interconnected depending brackets or bearings 93, which in turn support a respective one of a pair of spaced parallel rods 94, which rods also parallel the runway and extend parallel to the longitudinal axis of the runway, i.e., at right angles to the rods 92. The rods 94 slidably support four brackets or bearings 95 which are rigidly interconnected by a bearing plate 96. The bearing plate 96 is provided centrally thereof with an upright tubular bushing 97 alined with a hole through the plate which bushing is adapted for pivotal reception of the shaft 86 connecting the datum mount 87 and the beam end 81 at each end of the beam structure.

As a consequence of the above structure, the beam 30 is mounted for forward and backward movement by virtue of the slidable mounting of the plate 96 on the rods 94; for side-to-side movement by virtue of the slidable mounting of the brackets or bearings 93 on the rods 92; and for free swiveling movement in the horizontal plane by virtue of combinations of the two movements accommodated by the rods 92 and 94 and the pivotal mounting of the shaft 86 on the bearing plate 96.

Thus, the toe fixture illustrated in FIGURES 7 to 10 is constituted and mounted to attain the same objectives and the same operational advantages as the toe fixture described in conjunction with FIGURES 1 through 6. While the embodiment of the invention shown in FIGURES 7 to 10 is more complicated and expensive than that shown in FIGURES 1 to 4, this in no way detracts from its operational efficiency and effectiveness.

In view of the foregoing, it is believed apparent that all of the objects and advantages of the invention have been shown herein to be attained in a convenient, economical and practical manner.

While I have shown and described what I regard to be the preferred embodiments of my invention, it will be appreciated that various changes, rearrangements and modifications may be made therein without departing from the scope of the invention, as defined by the appended claims.

I claim:

1. A toe fixture for wheel alining apparatus including gauges to be attached to transversely opposed pairs of vehicle wheels and having toe determining elements, comprising beam means traversing the vehicle beneath and immediately adjacent the vehicle wheels, antifriction bearing means supporting said beam means with complete freedom for forward, backward, side-to-side and swiveling movement relative to the vehicle, said beam means being supported solely by said bearing means independently of the vehicle, and gauging surfaces adjacent each end of said beam means having a predetermined relation to one another and engageable with the toe determining elements of the gauges for establishing a reference for determination of wheel toe irrespective of the positions of the wheels.

2. A toe fixture for wheel alining apparatus including gauges to be attached to the outer sides of transversely opposed pairs of vehicle wheels and having outwardly facing toe determining elements, comprising a pair of interconnected beams beneath and traversing the vehicle immediately to the front and rear of the vehicle wheels, anti-friction bearing means supporting said beams with complete freedom for forward, backward, side-to-side and swiveling movement relative to the vehicle, and gauging surfaces adjacent each end of said beams disposed to the outer sides of the vehicle wheels, said gauging surfaces comprising vertically disposed planar surfaces facing toward one another in spaced parallel relation and engageable with the toe determining elements of the gauges, said beams and said gauging surfaces being supported solely by said bearing means independently of the vehicle and its wheels for establishing a reference for determination of wheel toe irrespective of the positions of the wheels.

3. A toe fixture for wheel alining apparatus including runways for the vehicle wheels and a wheel supporting plate on each runway, comprising a pair of rigid interconnected beams extending transversely below and beyond the opposite sides of the runways immediately to the front and rear respectively of the wheel supporting plates, anti-friction bearing means carried by the runways and supporting said beams with complete freedom for backward, forward, side-to-side and swiveling movement in a horizontal plane beneath said runways, and a gauging surface adjacent each end of said beams extending above the adjacent runway to the outer side thereof, said gauging surfaces having a predetermined relation to one another, said beams and said gauging surfaces being supported solely by said bearing means independently of the vehicle and its wheels for establishing a reference for determination of wheel toe irrespective of the positions of the wheels on the runways and plates.

4. A toe fixture for wheel alining apparatus including a pair of runways for the vehicle wheels, comprising rod means beneath each runway parallel thereto, bearing means comprising anti-friction rollers slidably and rotatably mounted on each rod means, beam means traversing the runways and movably supported on said rollers, said rollers constituting the sole support for said beam means and mounting the same for substantially frictionless longitudinal, transverse and swiveling movement relative to the runways, and gauging surfaces adjacent the opposite ends of said beam means.

5. A toe fixture for wheel alining apparatus including a pair of runways for the vehicle wheels, comprising a rod extending longitudinally beneath each runway parallel thereto, a pair of anti-friction spool bearings slidably and rotatably mounted on each rod, a pair of spaced parallel interconnected beams traversing the runways and resting freely adjacent their ends on said bearings for substantially frictionless longitudinal, transverse and swiveling movement relative to the runways, a mount guidably supported and adjustable on said beams adjacent each end of the beams, and a gauging surface extending upwardly from said mount above the adjacent runway to the outer side thereof, said gauging surfaces facing toward one another in spaced parallel relation transversely of said beams.

6. A toe fixture for wheel alining apparatus including a pair of runways for the vehicle wheels, comprising first rod means beneath each runway, bearings slidably mounted on each of said first rod means and carrying second rod means transverse to the first beneath each runway, bearings slidably mounted on each of said second rod means and carrying a bearing plate beneath each runway, beam means traversing the runways and pivotally connected at the opposite ends thereof to said mounting plates, and gauging surfaces adjacent the opposite ends of said beam means.

7. A toe fixture for wheel alining apparatus including a pair of runways for the vehicle wheels, comprising a first pair of spaced parallel rods beneath each runway, bearings slidably mounted on each of said first pairs of rods and carrying a second pair of spaced parallel rods beneath each runway, one pair of rods extending longitudinally of the runways and the other pair extending at right angles to the one pair, bearings slidably mounted on each of said second pairs of rods and carrying a bearing plate beneath each runway parallel thereto, a mount pivotally supported on each plate and carrying a gauging surface extending upwardly from said mount above the adjacent runway to the outer side thereof, and beam means traversing the runways and connected at the opposite ends thereof to said mounts, said gauging surfaces facing toward one another in spaced parallel relation transversely of said beam means.

8. An adapter for mounting gauges on vehicle wheels comprising a shaft including an enlarged tubular end portion having an end surface perpendicular to the axis of the shaft for abutment against the end face of the wheel hub, a plurality of circumferentially spaced levers pivotally mounted on said end portion and each including a tooth portion projecting axially beyond said end face for engagement with the periphery of the wheel hub and an actuating portion extending along said shaft, and an actuator mounted on and movable longitudinally of said shaft and having a conical cam surface engageable with the actuating portions of said levers for moving the tooth portions thereof into and out of engagement with the wheel hub as said actuator is moved longitudinally along said shaft.

9. A toe fixture for wheel alining apparatus including gauges to be attached to transversely opposed pairs of vehicle wheels and having toe determining elements, comprising beam means traversing the vehicle and having freedom for forward, backward, side-to-side and swiveling movement relative to the vehicle, and gauging surfaces adjacent each end of said beam means having a predetermined relation to one another and engageable with the toe determining elements of the gauges for establishing a reference for determination of wheel toe irrespective of the positions of the wheels, said gauging surfaces and the toe determining elements of the gauges having cooperable interlocking means for coupling said gauging surfaces and said beam means to the gauges and thereby to the vehicle wheels for conjoint turning movement with the wheels.

10. In wheel alining apparatus having runways for the vehicle wheels, wheel toe determining means comprising a pair of gauge means each including toe determining means having an outwardly projecting element, a pair of adapters detachably engageable with the hubs of the wheels of an opposed pair of wheels on the runways, each adapter including gauge mounting means paralleling the axis of the respective wheel, each gauge being pendulously mounted on the gauge mounting means of a respective adapter, beam means traversing the runways adjacent the opposed pair of vehicle wheels and supported by the runways with freedom for forward, backward, side-to-side and swiveling movement relative to the runways, and gauging surfaces adjacent the ends of said beam means having a predetermined relation to one another and engageable with the toe determining elements of the gauges for establishing a reference for determination of wheel toe irrespective of the positions of the wheels on the runways, said gauging surfaces and the toe determining elements of the gauges having cooperable interlocking means for coupling said gauging surfaces and said beam means to the gauges and thereby to the vehicle wheels for conjoint turning movement with the wheels.

11. In wheel alining apparatus having runways for the vehicle wheels, wheel toe determining means comprising a pair of gauge means each including toe determining means having an outwardly projecting element, a pair of adapters detachably engageable with the hubs of the wheels of an opposed pair of wheels on the runways, each adapter comprising a shaft including an enlarged tubular end portion having an end surface perpendicular to the axis of the shaft for abutment against the end face of the wheel hub, a plurality of circumferentially spaced levers pivotally mounted on said end portion and each including a tooth portion projecting axially beyond said end face for engagement with the periphery of the wheel hub and an actuating portion extending along said shaft, and a nut threaded on said shaft and having a conical cam surface engageable with the actuating portions of said levers for moving the tooth portions thereof into and out of engagement with the wheel hub as the nut is threaded along said shaft, each gauge being pendulously mounted on the said shaft of a respective adapter, beam means traversing the runways adjacent the opposed pair of vehicle wheels and supported by the runways with freedom for forward, backward, side-to-side and swiveling movement relative to the runways, and gauging surfaces adjacent the ends of said beam means having a predetermined relation to one another and engageable with the toe determining elements of the gauges for establishing a reference for determinination of wheel toe irrespective of the positions of the wheels on the runways, said gauging surfaces and the toe determining elements of the gauges having cooperable interlocking means for coupling said gauging surfaces and said beam means to the gauges and thereby to the vehicle wheels for conjoint turning movement with the wheels.

References Cited by the Examiner

UNITED STATES PATENTS

| 1,922,344 | 8/33 | Bagge | 33—203.17 |
| 2,079,070 | 5/37 | Johnston | 33—203.18 |
| 2,438,358 | 3/48 | Castiglia | 33—203.12 |
| 2,765,540 | 10/56 | MacMillan et al. | 33—203.18 |

ISSAC LISANN, *Primary Examiner.*